Patented Aug. 19, 1941

2,253,323

UNITED STATES PATENT OFFICE 2,253,323

PRODUCTION OF DRYING OILS

Friedrich Christmann, Ludwigshafen-on-the-Rhine, Germany, assignor, by mesne assignments, to General Aniline & Film Corporation, New York, N. Y., a corporation of Delaware No Drawing. Application January 11, 1939, Serial No. 250,382. In Germany January 15, 1938

4 Claims. (Cl. 196—78)

The present invention relates to improvements in the production of drying oils.

I have found that drying oils can be obtained in good yields by condensing products rich in unsaturated hydrocarbons which contain at least about 13.5 grams, preferably 15 grams, of hydrogen for each 100 grams of carbon, or which are obtained from carbonaceous substances rich in hydrogen and advantageously of high molecular weight which contain at least about 13.5 grams, preferably 15 grams, of hydrogen for each 100 grams of carbon, by treatment with metal halides or boron halides together with acid halides other than boron halides, in particular inorganic acid halides, such as phosgene, to form unsaturated products. Similar good results are obtained by carrying out the treatment of the unsaturated hydrocarbons with the said halides in the presence of hydrocarbons containing more than one double linkage or one or more triple linkages.

Products rich in unsaturated hydrocarbons according to this invention are such as contain at least 50 per cent, preferably at least 70 per cent of unsaturated hydrocarbons.

Initial materials rich in hydrogen which may be converted into products rich in unsaturated hydrocarbons are for example hard or soft paraffin wax, ceresine, ozokerite, Montan wax, paraffinic petroleum residues, crude petroleum jelly, crude lubricating oils rich in hydrogen or other oils rich in hydrogen obtained from petroleums or brown coal tars by distillation and/or treatment with selective solvents. The products obtained by the reduction of carbon monoxide at atmospheric or increased pressure, which may be of paraffinic or also olefinic nature, or the substances obtained by condensation or polymerization of olefines of low molecular weight, as for example such as are contained in cracking gases, or by voltolization of hydrocarbons, are also very suitable. The products rich in hydrogen obtained from coals, tars or mixed- or paraffinic-basic petroleums by pressure hydrogenation may also serve as initial materials.

For the production of unsaturated hydrocarbons, the said initial materials are cracked or dehydrogenated in known manner if they are not yet rich enough in unsaturated hydrocarbons. It is usual to work at temperatures above 350° C., if desired in the presence of cracking catalysts, as for example bleaching earths, which are preferably pretreated with acids, as for example with hydrofluoric acid, or alumina or metals of the 6th group of the periodic system or their compounds. The dehydrogenation may be carried out with an addition of sulphur or gases containing oxygen.

A specially suitable method for producing suitable unsaturated hydrocarbons consists in introducing chlorine, bromine, sulphur or oxygen, preferably in the presence of catalysts, such as iodine or antimony trichloride, into the initial materials and then splitting them off again, for example in the form of hydrogen compounds. This splitting off is advantageously effected at elevated temperature, as for example from 100° to 350° C. and in the presence of condensing agents having a mild action, such as bleaching earths, boric acid, oxalic acid or complex acids, as for example ansolvo acids or their salts. The hydrogen halide split off may also act as a mild condensing agent.

The unsaturated hydrocarbons prepared in the said manner may also be mixed with diolefines of low molecular weight, as for example allene, butadiene, chlorbutadiene, isoprene, diallyl, piperylene, conylene or compounds having triple linkages, as for example allylene, crotonylene or vinyl acetylene or mixtures containing the same in amounts of from 20 to 60 per cent or more. Mixtures of suitable olefines with diolefines may also be formed directly from the said initial materials rich in hydrogen by cracking them at elevated temperature, as for example above 470° C., preferably at from 500° to 700° C., or by introducing a larger amount of halogen, as for example from 15 to 25 per cent or more, into the initial materials and splitting it off again.

Unsaturated compounds containing oxygen, as for example unsaturated aldehydes, ketones, alcohols, acids or acid anhydrides, such as acrolein, crotonaldehyde, phorone, mesityl oxide, furane, geraniol, crotonic acid or maleic anhydride may also be added to the unsaturated hydrocarbons.

The olefines or mixtures of olefines with diolefines or compounds having triple linkages or unsaturated compounds containing oxygen thus obtained are condensed at temperatures between 10° and 100° C., advantageously between 30° and 70° C. with the aid of suitable metal halides or boron halides, in either event with acid halides. It is advantageous to work in the presence of diluents, in particular chlorinated hydrocarbons, as for example ethylene chloride or carbon tetrachloride.

As metal halides there may be mentioned for example the chlorides of aluminium, zinc, iron or titanium. These or the halides of boron, in particular boron fluoride, are added to the initial materials in an amount of from about 5 to 35 per cent. Into this mixtures there is led while stirring from 10 to 35 per cent of one or more acid chlorides, in particular inorganic acid chlorides, such as phosgene or thionyl chloride. The amount of halide and acid chloride to be used is dependent on the nature of the initial materials and on the desired iodine value of the condensation products. It is preferable to add to the condensing agents substances retarding the reaction, as for example zinc oxide or ammonia.

The condensation may also be carried out in the presence of small amounts, as for example from 1 to 20 per cent (with reference to the initial mixture) of cyclic compounds which if desired may also contain oxygen, nitrogen or sulphur. As such there may be mentioned for example benzene, toluene, naphthalene, fluorene, anthracene, pyrene, phenol or phenol ethers, as for example guaiacol. The completely hydrogenated cyclic compounds, as for example decahydronaphthalene or fractions containing the same which are formed for example in the pressure hydrogenation of mineral coal are especially suitable.

The products prepared according to this invention are strongly unsaturated oils having viscous properties, a molecular weight of more than 450 and an iodine value of from about 100 to 160. They may be used as drying oils, as for example as a substitute for drying vegetable oils or in admixture with the same. In thin layers they dry in the air to form hard elastic films, and this may be accelerated by heating, if desired with an addition of siccatives, such as oxides, acetates or borates of lead, manganese or cobalt.

The following example will further illustrate the nature of this invention but the invention is not restricted to this example. The parts are by weight.

Example 100 parts of a cracking product obtained by repeated cracking of paraffin wax at 500° C. are dissolved in about 30 parts of ethylene chloride. 30 parts of aluminium chloride are added to this solution while stirring and phosgene is led slowly through the mixture for some hours at from 50° to 60° C., the amount of phosgene being from 15 to 20 per cent with reference to the initial material. After shutting off the stream of phosgene, hydrochloric acid is added to dissolve the aluminium chloride, the aqueous solution removed and the solvent separated from the reaction product by distillation. About 90 parts of drying oil having an iodine value of 115 are obtained. The oil has excellent drying properties.

What I claim is:

1. A process for the production of drying oils from unsaturated hydrocarbons which comprises condensing liquid products rich in unsaturated aliphatic hydrocarbons obtained from carbonaceous substances containing at least about 13.5 grams of hydrogen for each 100 grams of carbon by treatment with a substance selected from the group consisting of metal halides of the Friedel-Crafts type and boron halides, together with from 10 to 35 per cent, calculated on the weight of the products rich in unsaturated hydrocarbons, of a halide selected from the class consisting of phosgene and thionyl chloride, to form unsaturated hydrocarbons of higher molecular weight.

2. The process as claimed in claim 1 which comprises using as initial material a hydrocarbon mixture containing large amounts of unsaturated hydrocarbons obtained from reduction products of carbon monoxide.

3. The process as claimed in claim 1 which comprises using as initial material a hydrocarbon mixture containing large amounts of unsaturated hydrocarbons which contains at least 13.5 grams of hydrogen for each 100 grams of carbon.

4. In the process as claimed in claim 1 employing as the acid halide phosgene.

FRIEDRICH CHRISTMANN.